United States Patent
Jones, Jr.

[15] 3,700,256
[45] Oct. 24, 1972

[54] FRONT END SUSPENSION

[72] Inventor: Elborn W. Jones, Jr., State College, Miss.

[73] Assignee: Allis-Chalmers Corporation, Milwaukee, Wis.

[22] Filed: Oct. 13, 1970

[21] Appl. No.: 80,286

[52] U.S. Cl. ............... 280/87 R, 180/1 F, 180/68 R, 280/111, 280/150 E, 280/150 F
[51] Int. Cl. ..................... B62d 25/08, B62d 37/04
[58] Field of Search ................... 280/80 R, 87 R, 111, 109, 150 E, 280/150 F; 180/54 D, 68, 1 F

[56] References Cited

UNITED STATES PATENTS

| | | | |
|---|---|---|---|
| 2,549,524 | 4/1951 | Rich | 180/54 D X |
| 2,580,481 | 1/1952 | Strehlow | 180/54 D X |
| 3,032,352 | 5/1962 | Barrett | 280/150 E |
| 3,582,104 | 6/1971 | Eggert, Jr. | 280/80 R |
| 3,370,670 | 2/1968 | Love | 280/111 X |
| 2,805,079 | 9/1957 | Vostrez | 280/111 |
| 2,701,728 | 2/1955 | Miller | 280/150 E |
| 3,595,410 | 7/1971 | Lemmon | 280/150 E |

FOREIGN PATENTS OR APPLICATIONS

| | | | |
|---|---|---|---|
| 630,158 | 11/1927 | France | 280/111 |

Primary Examiner—Benjamin Hersh
Assistant Examiner—John P. Silverstrim
Attorney—Arthur L. Nelson, Kenneth C. McKivett and Robert B. Benson

[57] ABSTRACT

A front end suspension system having the radius rods extending forwardly from the front axle to support a pivot pin journaled in a massive support member supporting the front end of the vehicle and maintaining stability and steering control.

10 Claims, 3 Drawing Figures

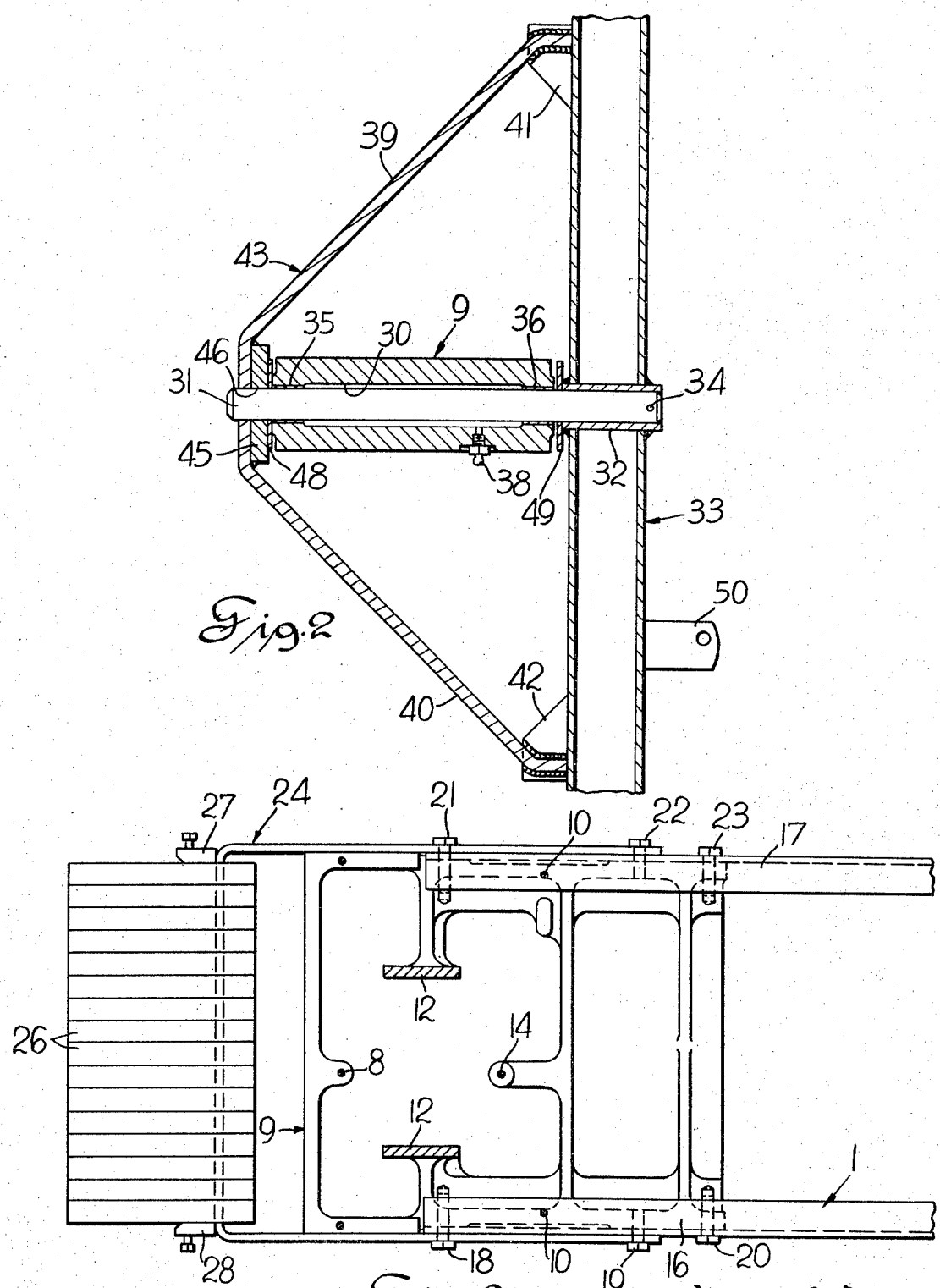

FRONT END SUSPENSION

This invention relates to suspension system and more particularly to a front end suspension including a front axle and radius rods supporting a pivot pin journaled in a massive support member connected to the vehicle chassis and supporting the front end weight hanger bracket, the air cleaner, the radiator, and the grill.

The recent trend of modern tractor design and particularly farm tractors is toward a longer, lower vehicle. The front wheels of the earlier tractor were positioned to provide support directly under the engine while later versions positioned the wheels forwardly of the engine thereby placing less weight on the front wheels. The longer and lower styling of the modern tractor also improves visibility by tapering the engine head.

With the use of the hydraulic weight distribution system the weight of the front wheels can be redistributed to the rear wheels in response to action of the hydraulic system when increased traction is required to maintain the required draft load. This further lightens the weight carried by the front wheels which decreases stability and in extreme cases may cause a loss of steering control where the front wheels do not carry sufficient weight for necessary traction to supply the turning force required. Due to the positioning of the front wheels and the use of the hydraulic weight distribution system it becomes necessary to place additional weight on the front wheels for general operating conditions. Accordingly, front end hanger brackets are used on the modern tractors for selectively positioning a plurality of weights which overhang from the front end of the tractor to increase the weight on the front wheels.

Additional weight can also be built in to the front of the vehicle. Accordingly this invention provides for a massive front end support member which is preferably constructed of cast iron. The massive member also provides means for journaling the pivot pin from the front axle which extends forwardly to engage the forward ends of the radius rods. Accordingly, the massive front end member provides a counterbalance means as well as a suspension means for the front end of the vehicle and provides connecting means for the various attachments on the front end of the vehicle. The attachments such as the radiator, the air cleaner, the grill, and the front end hanger bracket are all supported on the massive support member.

It is an object of this invention to provide a front end suspension for a vehicle.

It is another object of this invention to provide front end suspension including a casting supporting the front end of the vehicle and journaling the pivot pin on the front end of the vehicle which is connected to the front axle and the radius rods extending forwardly of the front axle.

It is a further object of this invention to construct the front end of the vehicle with a massive front end member providing support for the front end weight hanger bracket, the grill, the air cleaner, and the radiator and connection with the vehicle frame supporting the engine while simultaneously journaling a front axle pivot pin connected between the front axle and the radius rods extending forwardly of the axle.

It is a further object of this invention to provide a massive casting on the front end of the vehicle in connection with the chassis forming a rigid support for attachments on the vehicle and a suspension system for the front end of the vehicle.

The objects of this invention are accomplished by providing a massive casting in connection with the front end of the vehicle chassis and providing a support for the front end weight hanger bracket. The massive support member provides a support for the radiator, the air cleaner, and the grill and has a portion depending below the chassis providing a journal for the pivot connected between the front axle and the radius rods. Accordingly, the structural arrangement supplies weight on the front end of the vehicle and a suspension system for the front end of the vehicle.

The preferred embodiment of this invention is illustrated in the attached drawing.

FIG. 2 illustrates a cross section view taken on line II—II of FIG. 1;

FIG. 3 is a cross section view taken on line III—III of FIG. 1.

Figure 1:
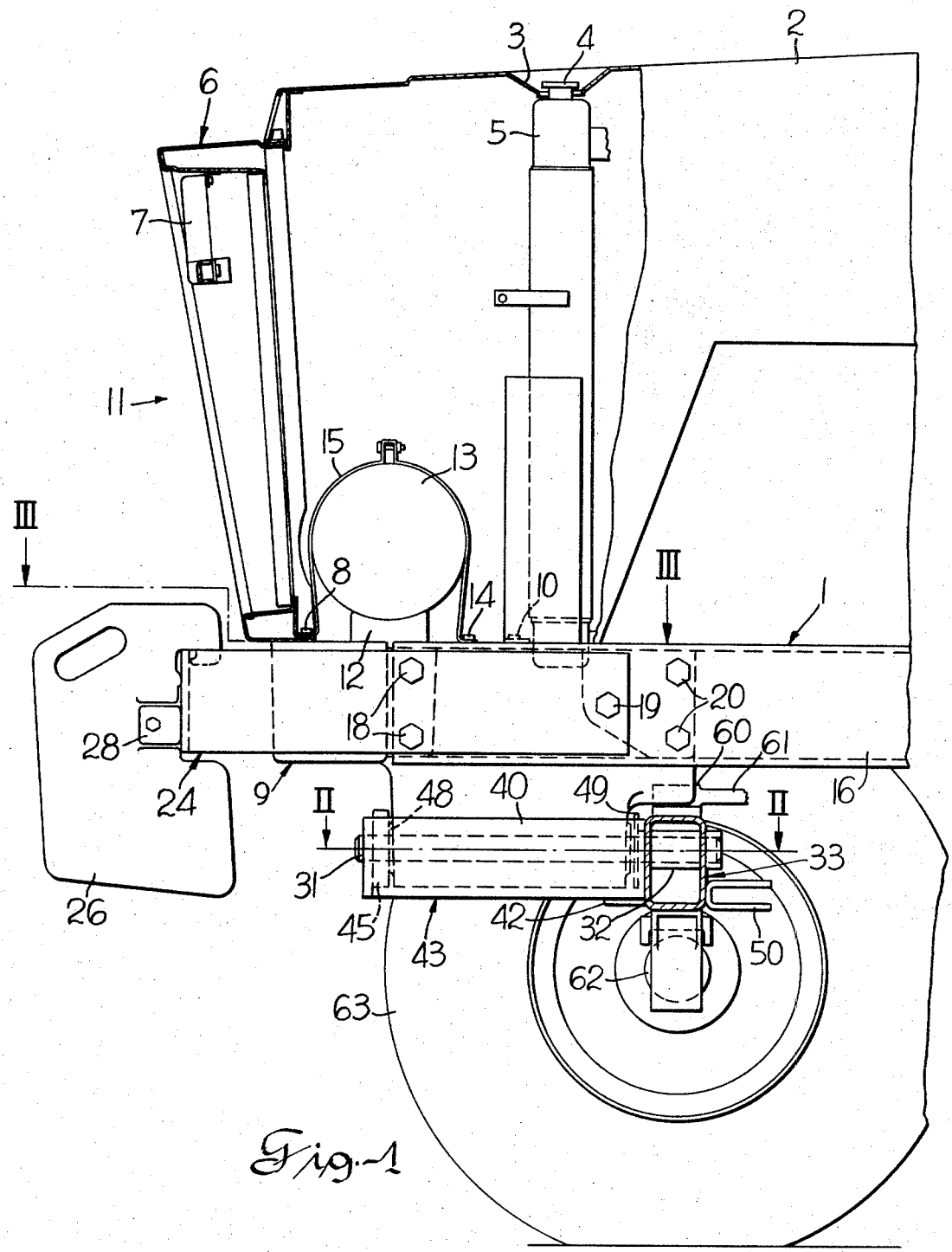
FIG. 1 illustrates a side elevation view partially in section of the front end of the vehicle.

Referring to the drawings, FIG. 1 illustrates a vehicle chassis 1 supporting the engine hood 2. The engine hood 2 has a recessed portion 3 to accomodate the filter cap 4 for the radiator 5. The engine hood extends forwardly to connect to the grill 6 carrying the headlight assembly 7. The grill 6 extends downwardly and is connected by fastening means as bolt 8 to the support member 9. The radiator 5 is connected to the support member 9 by fasteners 10. The member 9 is preferably made of cast iron and is of massive construction thereby adding substantially to the weight of the forward end of the tractor 11. The member 9 also has a pair of upright supports 12 integral with the member 9 which supports the air cleaner 13. The air cleaner 13 is fastened by the bolts 14 and 8 through the strap 15 which encircles the air cleaner 13.

The chassis 1 includes a frame consisting of a pair of channel irons 16 and 17 extending parallel along the side of the vehicle. The rearward ends of the channel irons are connected to the main housing on the rear end of the tractor and extend forwardly where they are fastened with a plurality of bolts 18, 19, and 20 as well as 21, 22 and 23. The channel irons accordingly are connected to the support member 9 and the bolts 18, 19, 21 and 22 also fasten the front end weight hanger bracket 24. The front end weight hanger bracket 24 is shown with a plurality of front end weights 26 which are locked by means of the fasteners 27 and 28.

The member 9 also forms a central opening 30 for receiving a pivot pin 31. The pivot pin 31 is embraced by the sleeve 32 which is welded to the front axle 33. A lock pin 34 extends through the sleeve 32 and the pin 31 to fix the pivot pin 31 nonrotatably to the front axle 33.

The central opening 30 of the member 9 is also fitted with bushings 35 and 36 in the ends of the opening which encircle the pin 31 to provide pivotal support for the member 9. The central opening 30 is adapted for receiving lubrication which is injected through the fitting 38 on the side of the member 9. The lubrication retained in the opening 30 is available to lubricate the bushings 35 and 36.

The front axle 33 is welded to the radius rods 39 and 40 which are in fact integral and formed by a metal strap 43 extending forwardly from the front axle 33. The gussets 41 and 42 are welded to each end of the strap 43 and the front axle. The strap 43 forming the radius rods 39 and 40 is also welded to the end plate 45 which forms an opening 46 for receiving the pin 31.

The pivot pin 31 is journaled in bushings 35 and 36 of member 9 and carries washers 48 and 49 on its end intermediate the end plate 45 and the member 9 and intermediate the sleeve 32 and the member 9. Accordingly, the member 9 is pivotally supported by the pin 31 which in turn is fixed to the front axle and supported by the front end of the radius rods 39 and 40.

The front axle 33 is also fitted with a bracket 50 which is adapted for connection to a single end hydraulic actuator in which the piston rod is connected to the steering link of the vehicle. For a more complete illustration and description of the steering linkage, reference may be had to the U.S. Pat. No. 3,527,316.

The front axle is pivotally supported on a king pin 60 having a steering arm 61 which is connected to a spindle 62 rotatably connected to the front wheel 63.

Accordingly, the pivot pin 31 of the front axle is journaled in the massive member 9 which provides a rigid mount for various attachments on the front end of the vehicle. The massive member 9 also provides a means for rigidly connecting the hanger bracket 24 to the chassis 1. The member 9 provides the basis of the front end suspension system while simultaneously providing weight for the front end of the vehicle. The member 9 operates as a base supporting structure for the attachments such as a front end weight hanger bracket 24, the grill 6, the air cleaner 13, and the radiator 5 as well as supporting the engine hood 2 enclosing the engine compartment.

The operation of the device will be described in the following paragraphs.

The member 9 is preferably a massive casting. The pivot pin 31 fastened to the front axle 33 extends forwardly to be received in an opening 46 at the junction on the forward end of the radius rods 39 and 40. A central opening 30 in the member 9 forms a bearing seat for the bushings 35 and 36 which form a journal for the pivot pin 31. Accordingly, the radius rods 39 and 40 extending forwardly of the front axle 33 instead of rearwardly permits clearance behind the front axle for positioning of the steering mechanism immediately behind the front axle and does not present any problem for clearance under the vehicle particularly when any repair work is being done on the underside of the vehicle.

The frame 19 also forms a base for supporting a plurality of attachments. A front end weight hanger bracket 24 is fastened to the member 9 by means of a plurality of bolts which also fasten the frame 1 consisting of the channel irons 16 and 17. The rigid assembly of the front end weight hanger bracket 24 with a member 9 and the frame 1 provides a rigid structure for supporting the front end of the vehicle and the engine within the engine hood 11. The member 9 provides a support for the radiator 5, the engine hood 2, the front end of the engine, the grill 6, and the air cleaner 13. Accordingly, the member 9 provides a base structure which ties together the forward end of the vehicle and serves as a ballast on the front end of the vehicle. The weight of the member 9 coupled with the weights 26 on the front end of the front end hanger bracket 24 assures adequate traction and steering control and the adding or subtracting from the combined weight by the use of a plurality of weights on the hanger bracket 24 provides versatility. The long bearing surface of the pivot pin 31 in the member 9 provides stability and smooth rolling of the front end of the vehicle even on rough terrain.

The embodiments of the invention in which an exclusive property or privilege is claimed are defined as follows:

1. A front end suspension system for a vehicle comprising, a front axle, a massive vehicle support member extending forwardly from said front axle, a vehicle frame connected to said member and extending rearwardly to form the vehicle chassis, radius rods integral with and extending forwardly of said axle, pin support means defined by the front end of said radius rods and said front axle, bearing means adjacent the front ends of said radius rods and adjacent said front axle in said massive support member, a single pivot pin received in said pin support means in the forward ends of said radius rods and said front axle and in said member to pivotally carry said support member for the length of the radius rods, means on said support member adapted for carrying auxiliary attachments of said vehicle to thereby provide front end ballast and long bearing support for stabilizing the front end of the vehicle and assuring adequate traction for positive steering control.

2. A front end suspension system for a vehicle as set forth in claim 1 wherein at least one of said attachments carried by said massive support member includes a radiator.

3. A front end suspension system for a vehicle as set forth in claim 1 wherein at least one of said auxiliary attachments carried by said massive support member includes an air cleaner.

4. A front end suspension system for a vehicle as set forth in claim 1 wherein at least one of said auxiliary attachments carried by said massive support member includes a front end hanger bracket adapted for removably attaching at least one front end weight.

5. A front end suspension system for a vehicle as set forth in claim 1 wherein said massive support member comprises a cast iron support member providing ballast for the front end of the vehicle to insure adequate traction for positive steering control.

6. A front end suspension system for a vehicle as set forth in claim 1 wherein said massive support member defines a central opening on a depending portion of said member, a bushing in either end of said central opening embracing the ends of said pivot pin and defining a lubrication reservoir intermediate said bushing for lubrication of the pivot pin and bushings in said member.

7. A front end suspension system for a vehicle as set forth in claim 1 wherein said massive support member includes a central portion depending downwardly and defining a central opening, bushings received in said central opening embracing said pivot pin to thereby provide a front axle pivot assembly for said vehicle.

8. A front end suspension system for a vehicle as set forth in claim 1 wherein said massive support member defines a central opening, a bushing received in said opening on either end of said pivot pin thereby defining a lubrication reservoir intermediate said bushings, a fitting connected to said reservoir in said member adapted for receiving lubrication to thereby lubricate said bushings on said pivot pin.

9. A front end suspension system for a vehicle as set forth in claim 1 wherein said front axle and said radius rods define openings transverse to said front axle for receiving said pivot pin, means fastening said pivot pin nonrotatably with said front axle to thereby provide a pivoting movement between said pivot pin and said massive support member.

10. A front end suspension system for a vehicle as set forth in claim 1 wherein said front axle and said radius rods define a welded integral structure, a pivot pin connected nonrotatably in said radius rods and said front axle, said member defining a casting for journaling said pivot pin positioned between said radius rods and said front axle.

* * * * *